(12) United States Patent
Weber et al.

(10) Patent No.: US 6,509,403 B1
(45) Date of Patent: Jan. 21, 2003

(54) MOULDING MATERIALS WITH A POLYARYLENE ETHER SULFONE AND ALIPHATIC POLYAMIDE BASE

(75) Inventors: Martin Weber, Maikammer (DE); Joachim Queisser, Mannheim (DE); Ulrich Eichenauer, Böhl-Iggelheim (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/763,698

(22) PCT Filed: Aug. 17, 1999

(86) PCT No.: PCT/EP99/06013
§ 371 (c)(1),
(2), (4) Date: Feb. 26, 2001

(87) PCT Pub. No.: WO00/12601
PCT Pub. Date: Mar. 9, 2000

(30) Foreign Application Priority Data

Aug. 28, 1998 (DE) .......................... 198 39 331

(51) Int. Cl.$^7$ .............................. C08K 3/10; C08K 3/16
(52) U.S. Cl. ...................... 524/413; 524/606; 524/609
(58) Field of Search ................ 524/413, 606, 524/609

(56) References Cited

U.S. PATENT DOCUMENTS

| | | |
|---|---|---|
| 5,157,064 A | 10/1992 | Gijsman |
| 5,527,844 A | 6/1996 | Weber |
| 5,639,833 A | 6/1997 | Weber |
| 5,907,010 A | 5/1999 | Weber |

FOREIGN PATENT DOCUMENTS

| | | |
|---|---|---|
| DE | 41 21 705 | 1/1993 |
| DE | 44 29 107 | 2/1996 |
| DE | 196 45131 | 5/1998 |
| EP | 232 496 | 8/1987 |
| EP | 390 277 | 10/1990 |
| EP | 477 757 | 4/1992 |
| EP | 513 488 | 11/1992 |
| EP | 745 642 | 12/1996 |
| EP | 796 879 | 9/1997 |

*Primary Examiner*—Peter Szekely
(74) *Attorney, Agent, or Firm*—Keil & Weinkauf

(57) ABSTRACT

Molding compositions comprise

A) at least one polyarylene ether sulfone,

B) at least one aliphatic polyamide,

C) at least one filler, and also if desired

D) an impact-modifying rubber or a mixture of various impact-modifying rubbers, and E) an additive or a mixture of various additives wherein the viscosity number of the polyamides B (measured in 0.5% strength by weight solution in 96% strength by weight sulfuric acid to DIN 53 727) is at least 180 ml/g, and the molding compositions comprise F) from 100 ppm to 0.5% by weight, based on the total weight of A to E, of copper bromide or copper iodide or a mixture of these.

7 Claims, No Drawings

MOULDING MATERIALS WITH A POLYARYLENE ETHER SULFONE AND ALIPHATIC POLYAMIDE BASE

The present invention relates to molding compositions which comprise

A) at least one polyarylene ether sulfone,

B) at least one aliphatic polyamide,

C) at least one filler, and also if desired

D) an impact-modifying rubber or a mixture of various impact-modifying rubbers, and E) an additive or a mixture of various additives, wherein the viscosity number of the polyamides B (measured in 0.5% strength by weight solution in 96% strength by weight sulfuric acid to DIN 53 727) is at least 180 ml/g, and the molding compositions also comprise F) from 100 ppm to 0.5% by weight, based on the total weight of A to E, of a copper halide.

The present invention further relates to a process for preparing the molding compositions, and also to the use of these for producing moldings, and to the resulting moldings.

Molding compositions based on polyarylene ether sulfones with polyamides have been known for a long time.

For example, DE-A 41 21 705 and 44 29 107 have disclosed mixtures which comprise partially aromatic copolyamides alongside polyarylene ethers. The first of these publications discloses blends comprising preferably partially aromatic copolyamides with relative viscosities of from 2.2 to 5.0, implying viscosity numbers of from 120 to 400 ml/g. The copolyamides described in DE-A 44 29 107 preferably have viscosity numbers of from 100 to 500 ml/g, in particular from 110 to 200 ml/g. Blends made from polyarylene ether sulfones with polyamides and having at least 50% by weight of hexamethylene terephthalamide units have been disclosed in EP-A 477 757. Preference is given to blends made from these polyamides and having viscosity numbers of up to 140 ml/g (implying that $\eta_{red}$ is 1.4 dl/g), since the polyamides with higher viscosities (up to an $\eta_{red}$ of 1.9 dl/g) are difficult to process. The molding compositions described in the publications mentioned have good heat resistance, but if moldings made from them are heated above 150° C. for prolonged periods their mechanical properties become impaired. EP-A 513 488 describes molding compositions based on polyarylene ethers with polyamides and having improved adhesive strength and improved compatibility with fillers and with other thermoplastics, and suitable for producing thermally stable adhesives. The polyamides preferably used include aliphatic polyamides, such as nylon-6. The viscosities of the polyamides which can be used are from 120 to 400 ml/g (implying that $\eta_{rel}$ is from 2.0 to 5.0). The heat resistance of these mixtures is still inadequate for some applications.

It is an object of the present invention to improve the heat resistance of molding compositions based on polyarylene ethers with polyamides. In particular, the moldings obtainable from these should withstand long-term exposure to temperatures above 150° C. without significant impairment of their mechanical properties. The molding compositions should also be very easy to process, and they should in particular have good flowability. Another requirement placed upon the molding compositions was that they should be simple and cost-effective to produce.

We have found that this object is achieved by means of the molding compositions defined at the outset, which are described in more detail below.

Component A

The proportion of component A in the novel molding compositions can vary widely. Preferred molding compositions according to the invention comprise amounts of from 2 to 97.8% by weight, in particular from 5 to 94.8% by weight, of component A, based on the total weight of A to E. Particularly preferred molding compositions comprise from 7.5 to 92.3% by weight of component A, based on the total weight of A to E.

According to the invention component A is a polyarylene ether sulfone. Component A may also be a mixture made from two or more different polyarylene ether sulfones.

The arylene groups of the polyarylene ether sulfones A may be identical or different and, independently of one another, are an aromatic radical having from 6 to 18 carbon atoms. Examples of suitable arylene radicals are phenylene, biphenylene, terphenylene, 1,5-naphthylene, 1,6-naphthylene, 1,5-anthrylene, 9,10-anthrylene and 2,6-anthrylene. Among these, preference is given to 1,4-phenylene and 4,4'-biphenylene. These aromatic radicals are preferably unsubstituted. However, they may have one or more substituents. Examples of suitable substituents are alkyl, arylalkyl, aryl, nitro, cyano and alkoxy groups, and also heteroaromatics, such as pyridine, and halogen. Preferred substituents include alkyl having up to 10 carbon atoms, such as methyl, ethyl, isopropyl, n-hexyl and isohexyl, $C_1$–$C_{10}$-alkoxy radicals, such as methoxy, ethoxy, n-propoxy and n-butoxy, aryl radicals having up to 20 carbon atoms, such as phenyl and naphthyl, and also fluorine and chlorine. Other preferred substituents are those obtainable by reacting the polyarylene ether sulfones with a reactive compound which has, besides a carbon-carbon double or triple bond, one or more carbonyl, carboxylic acid, carboxylate, anhydride, amide, imide, carboxylic ester, amino, hydroxyl, epoxy, oxazoline, urethane, urea, lactam or halobenzyl groups. The bonding of the arylene groups to one another in the polyarylene ether may be via —$SO_2$—, or, for example, via —O—, —S—, —SO—, —CO—, —N=N—, —COO—, or via an unsubstituted or substituted alkylene radical, or via a chemical bond.

Preferred polyarylene ether sulfones which can be used according to the invention (component A) have a structure made from recurring units of the formula I

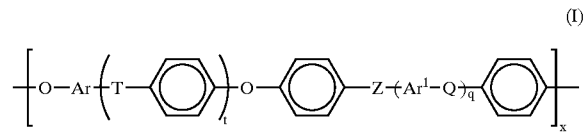

(I)

where x is 0.5 or 1, t and q, independently of one another, are 0, 1, 2 or 3, n is an integer from 0 to 6, each of Q, T and Z, independently of one another, is a chemical bond or a group selected from the class consisting of —O—, —S—, —$SO_2$—, S=O, C=O, —N=N , —$R^a$C=$CR^b$— and —$CR^cR^d$—, where each of $R^a$ and $R^b$, independently of one another, is hydrogen or $C_1$–$C_{12}$-alkyl and each of $R^c$ and $R^d$, independently of one another, is hydrogen or $C_1$–$C_{12}$-alkyl, $C_1$–$C_{12}$-alkoxy or $C_6$–$C_{18}$-aryl, where, if desired, $R^c$ and $R^d$ may independently of one another have fluorine and/or chlorine substituents or, together with the carbon atom to which they are bonded, may form a $C_3$–$C_{12}$-cycloalkyl group, which may be unsubstituted or substituted by one or more $C_1$–$C_6$-alkyl groups, with the proviso that at least one of the groups T, Q and Z is —SO$_2$— and if t and q are 0, Z is —SO$_2$—, and Ar, Ar$^1$, Ar$^2$ and Ar$^3$, independently of one another, are C$_6$–C$_{18}$-arylene, unsubstituted or substituted by C$_1$–C$_{12}$-alkyl, C$_6$–C$_{18}$-aryl, C$_1$–C$_{12}$-alkoxy or halogen.

Polyarylene ethers A which can be used according to the invention may be prepared, for example, in a manner similar to that of GB 1 152 035 and U.S. Pat. No. 4,870,153, which are expressly incorporated herein by way of reference. Examples of suitable process conditions for the synthesis of polyarylene ether sulfones are described in EP-A-0 113 112 and EP-A-0 135 130. The reaction of the monomers in aprotic polar solvents in the presence of anhydrous alkali metal carbonate is particularly suitable. A particularly preferred combination is N-methylpyrrolidone as solvent and potassium carbonate as catalyst. The reaction in the melt is similarly preferred. However, the introduction of terminal anhydride groups described there is not an essential requirement for the present invention. Examples of suitable polyarylene ether sulfones A are those having at least one of the following recurring structural units I$_1$ to I$_{15}$: for x=0.5 in formula I:

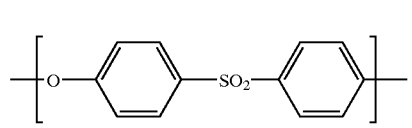

(I$_1$)

for x = 1 in formula I:

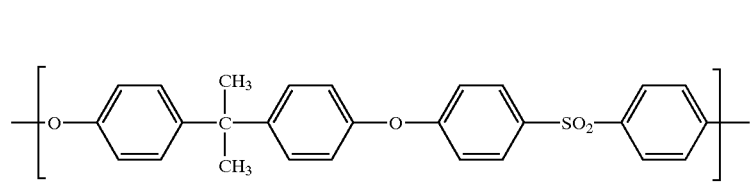

(I$_2$)

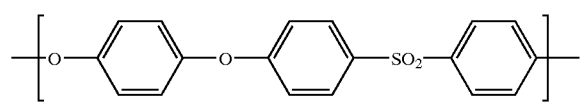

(I$_3$)

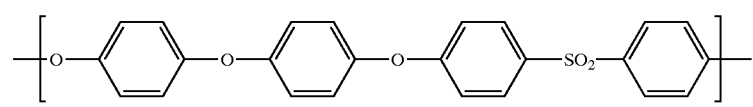

(I$_4$)

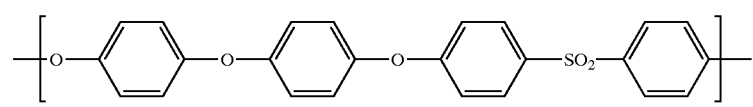

(I$_5$)

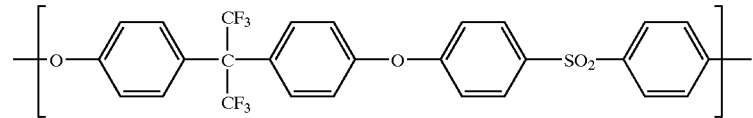

(I$_6$)

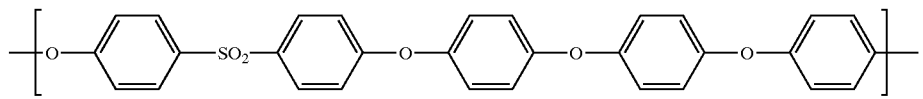

(I$_7$)

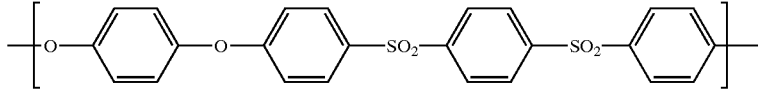

(I$_8$)

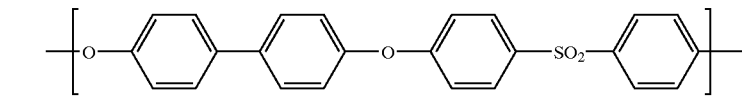

(I$_9$)

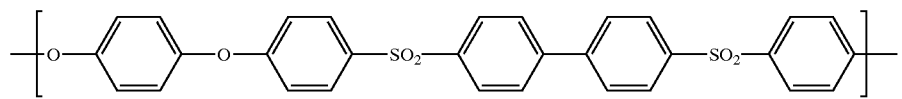

(I$_{10}$)

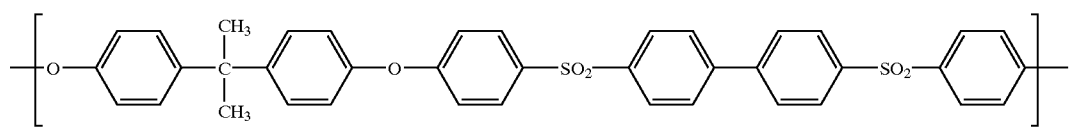

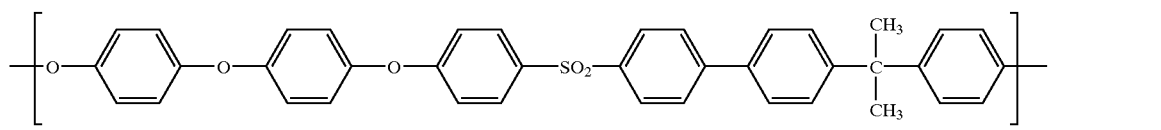

(I₁₁)

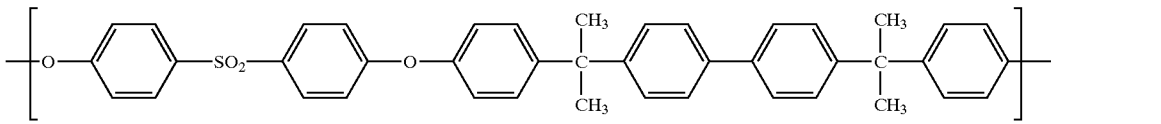

(I₁₂)

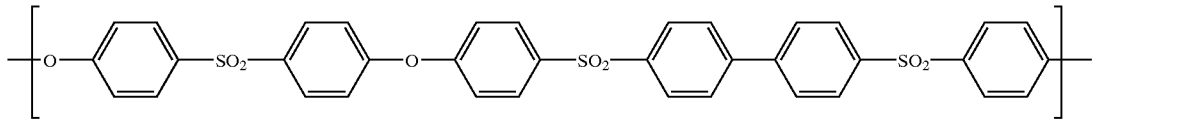

(I₁₃)

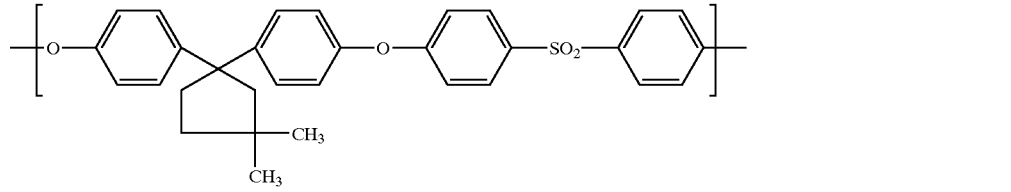

(I₁₄)

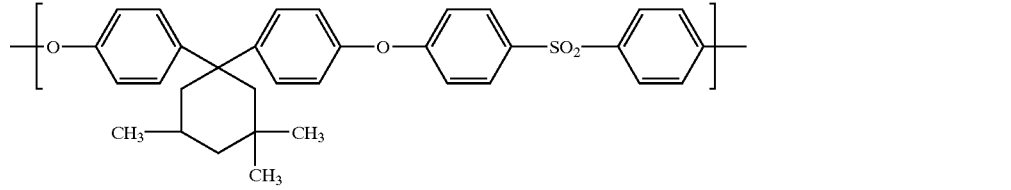

(I₁₅)

Particularly preferred units of the formula I are those of the formulae I₁ and I₂, individually or mixed.

Preferred polyarylene ether sulfones in one embodiment include carboxyl-containing polyarylene ether sulfones with recurring structural elements of the formulae I and II

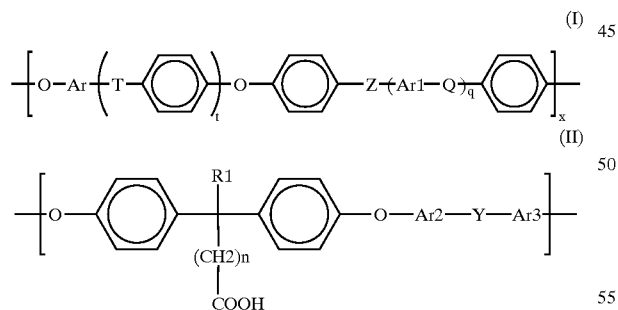

where the variables are as defined above and $R^1$ is H, $C_1$–$C_6$-alkyl or —(CH₂)$_n$—COOH, in particular mixed with polyarylene ether sulfones which contain inert groups and where x is 0.5 or 1, t and q, independently of one another, are 0, 1, 2 or 3, n is an integer from 0 to 6, each of Q, T, Y and Z, independently of one another, is a chemical bond or a group selected from the class consisting of —O—, —S—, —SO₂—, S=O, C=O, —N=N, $R^aC=CR^b$— and $CR^cR^d$—, where each of $R^a$ and $R^b$ independently of one another, is hydrogen or $C_1$–$C_{12}$-alkyl and each of $R^c$ and $R^d$ independently of one another, is hydrogen or $C_1$–$C_{12}$-alkyl, $C_1$–$C_{12}$-alkoxy or $C_6$–$C_{18}$-aryl, where if desired, $R^c$ and $R^d$ may independently of one another have fluorine and/or chlorine substituents or, together with the carbon atom to which they are bonded, may form a $C_3$–$C_{12}$-cycloalkyl group which may be unsubstituted or substituted by one or more $C_1$–$C_6$-alkyl groups with the proviso that at least one of the groups T, Q and Z is —SO₂— and if t and q are 0, Z is —SO₂—, and Ar, Ar¹, Ar², Ar³, independently of one another, are $C_6$–$C_{18}$-arylene, unsubstituted or substituted by $C_1$–$C_{12}$-alkyl, $C_6$–$C_{18}$-aryl, $C_1$–$C_{12}$-alkoxy or halogen.

These carboxyl-containing polyarylene ethers are obtainable, for example, by processes similar to those of EP-A-0 185 237 or to those described by I. W. Parsons et al., in Polymer, 34, 2836 (1993) and T. Koch, H. Ritter, in Macromol. Phys. 195, 1709 (1994).

Examples of suitable structural elements II are:

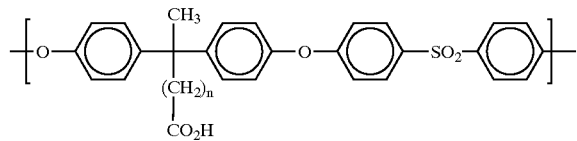

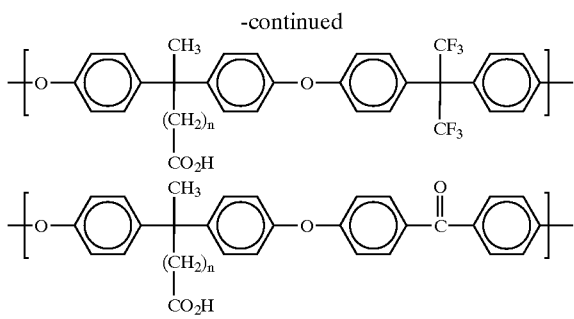

where each n is an integer from 0 to 4.

The polyarylene ether sulfones containing acid groups have viscosity numbers of from about 15 to 80 ml/g (determined in 1% strength NMP solution at 25° C.). If these polyarylene ether sulfones containing acid groups are used, the proportion of free acid groups in component A is preferably from 0.05 to 25 mol %, preferably from 0.1 to 20 mol % and in particular from 0.1 to 15 mol %. The proportion of acid groups is determined by $^1$H NMR as described by I. W. Parsons et al., Polymer, 34, 2836 (1993).

The polyarylene ether sulfones A may also be copolymers or block copolymers in which there are polyarylene ether sulfone segments and segments from other thermoplastic polymers, for example from polyesters, aromatic polycarbonates, polyester carbonates, polysiloxanes, polyimides or polyetherimides. The molecular weights (number-average) of the blocks or graft branches in the copolymers are generally from 1000 to 30,000 g/mol. The arrangement of blocks of different structure may be alternating or random. The proportion by weight of the polyarylene ether sulfones in the copolymers or block copolymers is generally at least 10% by weight, and may be up to 97% by weight. Preferred copolymers or block copolymers have a proportion of up to 90% by weight of polyarylene ether sulfones. Particularly preferred copolymers or block copolymers have from 20 to 80% by weight of polyarylene ether sulfones.

The polyarylene ether sulfones generally have average molecular weights $M_n$ (number-average) of from 5000 to 60,000 g/mol and relative viscosities of from 0.20 to 0.95 dl/g. Depending on the solubility of the polyarylene ether sulfones, the relative viscosities are measured either in 1% strength by weight N-methylpyrrolidone solution or in mixtures of phenol and dichlorobenzene, or in 96% strength sulfuric acid, in each case at 20 or 25° C.

Depending on the conditions for the synthesis, the polyarylene ether sulfones may have various end groups. These include those which are inert to component B and those which can react with functional groups of polyamides B, in particular with the amino and carboxyl groups.

Inert end groups include halo, in particular chloro, alkoxy, particularly methoxy or ethoxy, aryloxy, preferably phenoxy, and benzyloxy groups. Examples of reactive groups are hydroxyl, amino, anhydride, epoxy and carboxyl. Particular preference is given to polyarylene ether sulfones having amino, anhydride or epoxy end groups or mixtures of these.

Polyarylene ether sulfones A having hydroxyl end groups may be prepared, for example, by selecting an appropriate molar ratio of dihydroxy and dichloro monomers (see, for example, McGrath et al. Polym. Eng. Sci. 17, 647 (1977); Elias "Makromoleküle" 4th edn. (1981) pages 490–493, Hütig & Wepf.-Verlag, Basel).

Polyarylene ether sulfones A having amino end groups may be obtained, for example, if p-aminophenol, for example, is present during the polymerization (J. E. McGrath, Polymer 30, 1552 (1989)).

The preparation of polyarylene ether sulfones containing anhydride end groups is described, for example, in DE A 44 29 107.

Polyarylene ether sulfones having epoxy end groups can be prepared from polyarylene ether sulfones having OH end groups by, for example, reacting the latter with suitable compounds which have propylene oxide groups or from which propylene oxide groups are obtainable, preferably epichlorohydrin.

The reaction of the hydroxyl-terminated polyarylene ether sulfones with epichlorohydrin preferably takes place at from 30 to 200° C. in a solvent. Examples of suitable solvents for this are aliphatic or aromatic sulfides or sulfones, or else N-methylpyrrolidone. The reaction is generally carried out in a weakly basic medium to avoid, as far as possible, ring-opening of the epoxy groups.

In one embodiment the novel molding compositions comprise polyarylene ether sulfones A which are substantially free from reactive end groups. However, it is also possible in a preferred embodiment to use mixtures of various polyarylene ether sulfones with inert and reactive end groups. The proportion of the polyarylene ether sulfones having reactive end groups may be from 2 to 98% by weight, preferably from 5 to 50% by weight, based on component A.

Component B

The proportion of component B in the novel molding compositions may vary widely. According to the invention, preferred molding compositions comprise amounts of from 2 to 97.9% by weight of component B, in particular from 5 to 94.9% by weight, based on the total weight of A to E. Particularly preferred molding compositions comprise from 7.5 to 92.4% by weight of component B, based on the total weight of A to E.

According to the invention, component B is an aliphatic polyamide. Component B may also be a mixture of two or more different aliphatic polyamides. According to the invention the polyamides B have a viscosity number of at least 180 ml/g (measured in 0.5% strength by weight solution in 96% strength by weight sulfuric acid to DIN 53 727). In preferred molding compositions the polyamides B have a viscosity number of at least 190 ml/g, preferably at least 195 ml/g, in particular more than 200 ml/g, for example 205 ml/g or above (measured as above). In one of the preferred embodiments the viscosity number may be more than 230 ml/g (measured as above).

Aliphatic polyamides are known per se or can be obtained by processes known per se.

The polyamides B may, for example, be prepared by condensing equimolar amounts of a saturated dicarboxylic acid having from 4 to 16 carbon atoms and a saturated diamine having up to 16 carbon atoms, or by condensing ω-aminocarboxylic acids or polyaddition of corresponding lactams.

Suitable monomers of these types which may be mentioned here merely as examples are adipic acid, suberic acid, azelaic acid and sebacic acid representing the aliphatic dicarboxylic acids, and 1,4-butanediamine, 1,5-pentanediamine and piperazine as representatives of the diamines, and caprolactam, caprylolactam, enantholactam, laurolactam and ω-aminoundecanoic acid representing, respectively, lactams and aminocarboxylic acids.

Other suitable monomers are aliphatic cyclic diamines such as those of the formula (III)

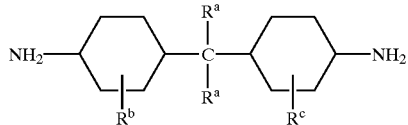

(III)

where
R$^a$ is hydrogen or C$_1$–C$_4$-alkyl,
R$^b$ is C$_1$–C$_4$-alkyl or hydrogen, and
R$^c$ is C$_1$–C$_4$-alkyl or hydrogen.

Particularly preferred aliphatic cyclic diamines are bis(4-aminocyclohexyl)methane, bis(4-amino-3-methylcyclohexyl)methane, bis(4-aminocyclohexyl)-2,2-propane and bis(4-amino-3-methylcyclohexyl)-2,2-propane.

Other aliphatic cyclic diamines which may be mentioned are 1,3- and 1,4-cyclohexanediamine and isophoronediamine.

In one of the preferred embodiments component B is polybutylene adipamide (nylon-4,6). In another of the preferred embodiments polyhexamethylene adipamide (nylon-6,6) or polycaprolactam (nylon-6) is used. However, it is also possible for component B to be a mixture made from two or all of these polyamides mentioned above. Component B may comprise, for example, based on the weight of component B, from 1 to 99% by weight, preferably from 10 to 90% by weight, of nylon-4,6 and from 1 to 99% by weight, preferably from 10 to 90% by weight, of nylon-6,6 or of nylon-6. Another example of a preferred component B is a mixture of from 1 to 99% by weight of nylon-6,6 and from 1 to 99% by weight of nylon-6, where the percentages by weight are based on the weight of component B.

Component C

Alongside components A and B, the novel molding compositions comprise from 0.1 to 60% by weight of reinforcing materials and fillers. The novel molding compositions preferably comprise from 0.1 to 55% by weight, in particular from 0.1 to 50% by weight, based on components A to E, of fibrous or particulate fillers or reinforcing materials or mixtures of these.

Preferred fibrous fillers or fibrous reinforcing materials are carbon fibers, potassium titanate whiskers, aramid fibers and particularly glass fibers. If glass fibers are used they may have been provided with a size, preferably a polyurethane size, and with a coupling agent, to improve compatibility with the matrix material. The carbon fibers and glass fibers used generally have a diameter of from 6 to 20 $\mu$m.

The glass fibers may be incorporated either as short glass fibers or else as continuous-filament strands (rovings). The average length of the glass fibers in the finished injection molding is preferably from 0.08 to 0.5 mm.

Carbon fibers or glass fibers may also be used as wovens, mats or glass filament rovings.

Suitable particulate fillers are amorphous silica, carbonates, such as magnesium carbonate or chalk, powdered quartz, mica, a very wide variety of silicates, such as clays, muscovite, biotite, suzoite, tin maletite, talc, chlorite, phlogophite, feldspar, calcium silicates, such as wollastonite, or aluminum silicates, such as kaolin, particularly calcined kaolin.

In a particularly preferred embodiment use is made of particulate fillers in which at least 95% by weight, preferably at least 98% by weight, of the particles have a diameter (maximum dimension) determined on the finished product of less than 45 $\mu$m, preferably less than 40 $\mu$m and an aspect ratio of from 1 to 25, preferably from 2 to 20, determined on the finished product.

The particle diameters here may, for example, be determined by taking electron micrographs of cross sections of the polymer mixture and using at least 25, preferably at least 50, filler particles for the evaluation. The particle diameters may also be determined by sedimentation analysis as in Transactions of ASAE, page 491 (1983). The proportion by weight of fillers of size below 40 $\mu$m may also be measured by screen analysis. The aspect ratio is the ratio of particle diameter to thickness (largest to smallest dimension).

Particularly preferred particulate fillers are talc, kaolin, such as calcined kaolin, and wollastonite and mixtures of two or all of these fillers. Among these, particular preference is given to talc with a proportion of at least 95% by weight of particles of diameter less than 40 $\mu$m and with an aspect ratio of from 1.5 to 25, determined in each case on the finished product. Kaolin preferably has a proportion of at least 95% by weight of particles of diameter less than 20 $\mu$m and an aspect ratio of from 1.2 to 20, determined in each case on the finished product.

Component D

The novel molding compositions may, if desired, comprise impact-modifying rubbers D. The proportion of these may vary widely. Preferred molding compositions according to the invention comprise amounts of from 0 to 30% by weight of component D, in particular from 0 to 20% by weight, based on the total weight of A to E. Particularly preferred molding compositions comprise from 0 to 17.5% by weight of component D, based on the total weight of A to E.

Component D may also be a mixture of two or more different impact-modifying rubbers.

Rubbers which increase the toughness of molding compositions generally have two significant features: they comprise an elastomeric fraction which has a glass transition temperature below —10° C., preferably below –30° C., and they contain at least one functional group which can interact with the polyamide or polyarylene sulfone. Examples of suitable functional groups are carboxylic acid, carboxylic anhydride, carboxylic ester, carboxamide, carboximide, amino, hydroxyl, epoxy, urethane and oxazoline groups.

Preferred components D are functionalized rubbers. Preferred functionalized rubbers include functionalized polyolefin rubbers built up from the following components:

d$_1$) from 40 to 99% by weight of at least one α-olefin having from 2 to 8 carbon atoms;

d$_2$) from 0 to 50% by weight of a diene;

d$_3$) from 0 to 45% by weight of a C$_1$–C$_{12}$-alkyl ester of acrylic or methacrylic acid, or mixtures of esters of this type;

d$_4$) from 0 to 40% by weight of an ethylenically unsaturated C$_2$–C$_{20}$ mono- or dicarboxylic acid or of a functional derivative of an acid of this type;

d$_5$) from 1 to 40% by weight of a monomer containing epoxy groups; and d$_6$) from 0 to 5% by weight of other monomers capable of free-radical polymerization.

Examples of suitable α-olefins d$_1$) are ethylene, propylene, 1-butylene, 1-pentylene, 1-hexylene, 1-heptylene, 1-octylene, 2-methylpropylene, 3-methyl-1-butylene and 3 ethyl-1-butylene. Ethylene and propylene are preferred.

Examples of suitable diene monomers d$_2$) are conjugated dienes having from 4 to 8 carbon atoms, such as isoprene and butadiene, nonconjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or mixtures of these. Preference is given to 1,5-hexadiene, 5-ethylidenenorbornene and dicyclopentadiene. The diene content is preferably from 0.5 to 50% by weight, in particular from 2 to 20% by weight and particularly preferably from 3 to 15% by weight, based on the total weight of the olefin polymer.

Examples of suitable esters $d_3$) are methyl, ethyl, propyl, n-butyl, isobutyl, 2-ethylhexyl, octyl and decyl acrylates and the corresponding methacrylates. Among these preference is given to methyl, ethyl, propyl, n-butyl and 2-ethylhexyl acrylate and methacrylate.

Instead of the esters $d_3$), or in addition to these, the olefin polymers may also comprise acid-functional and/or latently acid-functional monomers in the form of ethylenically unsaturated mono- or dicarboxylic acids $d_4$).

Examples of monomers $d_4$) are acrylic acid, methacrylic acid, tertiary alkyl esters of these acids, in particular tert-butyl acrylate, and dicarboxylic acids, such as maleic acid and fumaric acid, and derivatives of these acids, and also their half esters.

For the purposes of the invention, latently acid-functional monomers are those compounds which under the conditions of the polymerization or during incorporation of the olefin polymers into the molding compositions form free acid groups. Examples of these are anhydrides of dicarboxylic acids having from 2 to 20 carbon atoms, in particular maleic anhydride, and tertiary $C_1$–$C_{12}$-alkyl esters of the above-mentioned acids, in particular tert-butyl acrylate and tert-butyl methacrylate.

Ethylenically unsaturated dicarboxylic acids and anhydrides $d_4$) have the following formulae IV and V:

(IV)

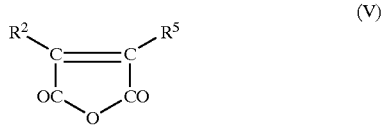

(V)

where $R^2$, $R^3$, $R^4$ and $R^5$, independently of one another, are H or $C_1$–$C_6$-alkyl.

Monomers $d_5$) containing epoxy groups have the following formulae VI and VII

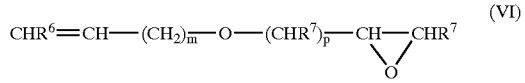

(VI)

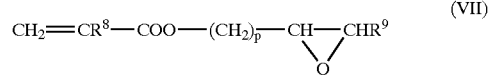

(VII)

where $R^6$, $R^7$, $R^8$ and $R^9$, independently of one another, are H or $C_1$–$C_6$-alkyl, m is an integer from 0 to 20, and p is an integer from 0 to 10.

$R^2$ to $R^9$ are preferably hydrogen, m is preferably 0 or 1 and p is preferably 1.

Preferred compounds $d_4$) and, respectively, $d_5$) are maleic acid, fumaric acid and maleic anhydride and, respectively, alkenyl glycidyl ethers and vinyl glycidyl ether.

Particularly preferred compounds of the formulae IV and V and, respectively, VI and VII are maleic acid and maleic anhydride and, respectively, acrylates and/or methacrylates both of which contain epoxy groups, in particular glycidyl acrylate and glycidyl methacrylate.

Particularly preferred olefin polymers are those made from
from 50 to 98.9% by weight, in particular from 60 to 94.85% by weight, of ethylene, and
from 1 to 50% by weight, in particular from 5 to 40% by weight, of an ester of acrylic or methacrylic acid, and
from 0.1 to 20.0% by weight, in particular from 0.15 to 15% by weight, of glycidyl acrylate and/or glycidyl methacrylate, acrylic acid and/or maleic anhydride.

Particularly suitable functionalized rubbers D are ethylene-methyl methacrylate-glycidyl methacrylate polymers, ethylene-methyl acrylate-glycidyl methacrylate polymers, ethylene-methyl acrylate-glycidyl acrylate polymers and ethylene-methyl methacrylate-glycidyl acrylate polymers.

Examples of other monomers $d_6$) are vinyl esters and vinyl ethers.

The polymers described above may be prepared by processes known per se, preferably by random copolymerization at high pressure and elevated temperature.

The melt index of the copolymers is generally from 1 to 80 g/10 min (measured at 190° C. and 2.16 kg load).

Core-shell graft rubbers are another group of suitable rubbers. These are graft rubbers prepared in emulsion and composed of at least one hard and one soft constituent. Usually, a hard constituent is a polymer with a glass transition temperature of at least 250° C., and a soft constituent is a polymer with a glass transition temperature of not more than 0° C. These products have a structure made from a core and from at least one shell, and the structure is a result of the sequence of addition of the monomers. The soft constituents generally derive from butadiene, isoprene, alkyl acrylates, alkyl methacrylates or siloxanes and, if desired, other comonomers. Suitable siloxane cores may be prepared, for example, starting from cyclic oligomeric octamethyltetrasiloxane or from tetravinyltetramethyltetrasiloxane. These may, for example, be reacted with γ-mercaptopropylmethyldimethoxysilane in a ring-opening cationic polymerization, preferably in the presence of sulfonic acids, to give the soft siloxane cores. The siloxanes may also be crosslinked by, for example, carrying out the polymerization in the presence of silanes having hydrolyzable groups, such as halo or alkoxy, for example tetraethoxysilane, methyltrimethoxysilane or phenyltrimethoxysilane. Examples of suitable comonomers for this are styrene, acrylonitrile and crosslinking or grafting monomers having more than one polymerizable double bond, for example diallyl phthalate, divinylbenzene, butanediol diacrylate or triallyl (iso)cyanurate. The hard constituents generally derive from styrene, α-methylstyrene or from copolymers of these, and preferred comonomers here are acrylonitrile, methacrylonitrile and methyl methacrylate.

Preferred core-shell graft rubbers comprise a soft core and a hard shell or a hard core, a first soft shell and at least one further hard shell. The incorporation of functional groups here, such as carbonyl, carboxylic acid, anhydride, amide, imide, carboxylic ester, amino, hydroxyl, epoxy, oxazoline, urethane, urea, lactam or halobenzyl, preferably takes place by adding suitably functionalized monomers during the polymerization of the final shell. Examples of suitable functionalized monomers are maleic acid, maleic anhydride, half esters or diesters, or maleic acid, tert-butyl (meth)acrylate, acrylic acid, glycidyl (meth)acrylate and vinyloxazoline. The proportion of monomers with functional groups is generally from 0.1 to 25% by weight, preferably from 0.25 to 15% by weight, based on the total weight of the core-shell graft rubber. The weight ratio of soft to hard constituents is generally from 1:9 to 9:1, preferably from 3:7 to 8:2.

Rubbers of this type are known per se and are described, for example, in EP-A 208 187.

Thermoplastic polyester elastomers are another group of suitable impact modifiers. For the purposes of the invention, polyester elastomers are segmented copolyetheresters which comprise long-chain segments generally deriving from poly (alkylene) ether glycols and short-chain segments deriving from low-molecular-weight diols and dicarboxylic acids. Products of this type are known per se and are described in the literature, for example in U.S. Pat. No. 3,651,014. Corresponding products are also available commercially as Hytrel® (Du Pont), Arnitel® (Akzo) and Pelprene® (Toyobo Co. Ltd.).

It is also, of course, possible to use mixtures of various rubbers.

Component E

The novel molding compositions comprise, as component E, additives, such as processing aids or mixtures of various additives.

Their proportion, based on the total weight of components A to E, is generally up to 40% by weight, preferably from 0.1 to 15% by weight.

Examples of usual additives are stabilizers and oxidation inhibitors, agents to inhibit decomposition by heat or by ultraviolet light, lubricants and mold-release agents, dyes, pigments and plasticizers.

Pigments and dyes are generally present in amounts of up to 6% by weight, preferably from 0.5 to 5% by weight and in particular from 0.5 to 3% by weight.

The pigments for coloration of thermoplastics are well known, see for example R. Gächter and H. Müller, Taschenbuch der Kunststoffadditive, Carl Hanser Verlag, 1983, pp. 494–510. A first preferred group of pigments is that of white pigments, such as zinc oxide, zinc sulfide, white lead (2 $PbCO_3.Pb(OH)_2$), lithopones, antimony white and titanium dioxide. Of the two most common crystal forms of titanium dioxide (rutile and anatase) it is the rutile form in particular which is used for white coloration of the novel molding compositions.

Black pigments which may be used according to the invention are iron oxide black ($Fe_3O_4$), spinel black ($Cu(Cr, Fe)_2O_4$), manganese black (a mixture of manganese dioxide, silica and iron oxide), cobalt black and antimony black, and particularly preferably carbon, usually used in the form of furnace black or gas black (see in this connection G. Benzing, Pigmente fur Anstrichmittel, Expert-Verlag (1988), pp. 78ff.).

Inorganic color pigments, such as chromium oxide green, or organic color pigments, such as azo pigments and phthalocyanines, may, of course, be used according to the invention to achieve particular shades of color. Pigments of this type are widely available commercially.

Examples of oxidation inhibitors and heat stabilizers which according to the invention may be added to the thermoplastic compositions are halides of metals of Group I of the Periodic Table, e.g. of sodium, potassium and lithium. It is also possible to use zinc fluoride and zinc chloride. Other compounds which may be used are sterically hindered phenols, hydroquinones, substituted representatives of this class, secondary aromatic amines, if desired combined with phosphorus-containing acids and/or salts of these, and mixtures of these compounds, preferably in concentrations of up to 1% by weight, based on the weight of the mixture.

Examples of UV stabilizers are various substituted resorcinols, salicylates, benzotriazoles and benzophenones, which are generally used in amounts of up to 2% by weight.

Lubricants and mold-release agents, which are usually added in amounts of up to 1% by weight to the thermoplastic composition, are stearic acid, stearyl alcohol, alkyl stearates and stearamides, and also esters of pentaerythritol with long-chain fatty acids. It is also possible to use stearates of calcium, of zinc or of aluminum, and also dialkyl ketones, e.g. distearyl ketone.

The additives also include stabilizers which inhibit the decomposition of red phosphorus, which may be employed as flame retardant compound, in the presence of moisture and atmospheric oxygen. Examples of these are compounds of cadmium, of zinc, of aluminum, of tin, of magnesium, of manganese and of titanium. Examples of particularly suitable compounds are oxides of the metals mentioned, and also carbonates and oxycarbonates, hydroxides, and also salts of organic or of inorganic acids, such as acetates or phosphates or hydrogenphosphates.

Other possible additives are nucleating agents, such as talc.

Component F

The proportion of component F in the novel molding compositions is from 100 ppm to 0.5% by weight, in particular from 200 ppm to 0.4% by weight, based on the total weight of A to E. Particularly preferred molding compositions comprise from 500 ppm to 0.35% by weight of component F, based on the total weight of A to E.

According to the invention, component F is copper bromide or copper iodide or mixtures of these. Copper iodide is preferred.

It is particularly preferable for component F to be the only halide used, i.e. the halides mentioned under component E are preferably not present in the novel molding compositions.

The novel molding compositions may be prepared by processes known per se, for example extrusion.

The molding compositions may, for example, be prepared by mixing the starting components in conventional mixing equipment, such as screw extruders, preferably twin-screw extruders, Brabender mixers or Banbury mixers, or also kneaders, followed by extrusion. The extrudate is usually cooled and comminuted.

The sequence of mixing the components may be varied. Two or, if desired, three components may be premixed, but it is also possible to mix all of the components together.

It is particularly preferable to prepare a premix made from components B and F and to mix this with the other components. A melt of the premix is preferably metered into the melt of the other components.

To obtain a very homogeneous molding composition, intensive mixing is advantageous. Average mixing times required for this are generally from 0.2 to 30 minutes at from 280 to 380° C.

A particular distinguishing feature of the novel molding compositions is their heat-ageing resistance over long periods. They also have very good flowability. They are suitable for producing moldings. The novel molding compositions are in particular suitable for producing moldings in the vehicle sector, especially the automotive sector. Examples of these are intake pipes, water reservoirs, housings, ventilation pipes, fastening components, sleeves and cooling fan wheels.

EXAMPLES

Test Methods

The viscosity number (VN [ml/g]) of the polyarylene ethers was determined in 1% strength by weight solution in N-methylpyrrolidone at 25° C.

The viscosity number (VN [ml/g]) of the polyamides was determined to DIN 53 727 on a 0.5% strength by weight solution in 96% strength by weight sulfuric acid at 25° C.

The proportion of acid groups in the copolyarylene ethers was determined by $^1$H NMR spectroscopy as in I. W. Parsons et al., Polymer 34, 2836 (1993).

The glass transition temperature and melting peak were determined using DSC measurements on specimens in the second heating cycle at a heating rate of 20 K/min.

The heat resistance of these specimens was determined by their Vicat softening point (Vicat B [°C.]). This was determined to DIN 53 460 with a force of 49.05 N and a temperature rise of 50 K/h, using standard small specimens.

Impact strength ($a_n$ [kJ/m$^2$]) was determined on ISO 179 1eU specimens (average value from 10 measurements), with edge impact.

Stiffness (modulus of elasticity) was determined to DIN 53 457 (average value from 10 measurements) at a separation rate of 10 mm/min for reinforced specimens and 50 mm/min for unreinforced specimens.

Ultimate tensile strength ($\sigma_{zR}$ [kN/mm$^2$]) and elongation at break ($\epsilon_{zR}$ [%]) were measured to DIN 53 455 at a separation rate of 10 mm/min.

Flowability (MVI [ml/10]) was determined to DIN 53 735 at 300° C. and with a load of 10 kg (average value from 3 measurements).

The measure used for the heat resistance of reinforced specimens was to determine percentage change in ultimate tensile strengths (determined via the tensile test to DIN 53 455 with a separation rate of 10 mm/min, average value from 10 measurements) before and after storing test specimens (height×width×length×thickness: 4×20×170×4 mm) at 180° C. for 100, 500 and 1000 h.

The measure used for the heat resistance of unreinforced specimens was percentage change in penetration energy (determined to DIN 53 443 at a velocity of 4.5 m/s) before and after storing disks (60×2 mm) at 150° C. for 100, 500 and 1000 h.

Preparation of the molding compositions
Component A1

The polyarylene ether sulfone A1 had recurring units of the formula $I_1$: Ultrason® E 2010, commercial product from BASF AG. This product has a viscosity number of 54 ml/g, measured in 1% strength NMP solution at 25° C.

Component B1 comp

Polyamide B1 comp was a partially aromatic copolyamide condensed from 55 parts by weight of terephthalic acid, 35 parts by weight of ε-caprolactam and 38.5 parts of hexamethylenediamine, and had a viscosity number of 210 ml/g. This product also has a glass transition at 110° C. and a melting peak at 289° C. Component B1

Polyamide B1 was a nylon-6, obtained from ε-caprolactam with a viscosity number of 250 ml/g (Ultramid®B4, commercial product from BASF AG). Component B2

Polyamide B2 was a nylon-6,6 obtained from hexamethylenediamine and adipic acid, with a viscosity number of 205 ml/g (Ultramid® A4, commercial product from BASF AG).

Component B2 comp

Polyamide B2 comp was a partially aromatic copolyamide condensed from 55 parts by weight of terephthalic acid, 35 parts by weight of ε-caprolactam and 35 parts by weight of hexamethylenediamine, and had a viscosity number of 130 ml/g. This product also has a glass transition at 110° C. and a melting peak at 289° C.

Component B3 comp

Polyamide B3 comp was a nylon-6, obtained from ε-caprolactam, with a viscosity number of 150 ml/g (Ultramid®B3, commercial product from BASF AG)

Component B4 comp

Polyamide B4 comp was a nylon-6,6, obtained from hexamethylenediamine and adipic acid, with a viscosity number of 160 ml/g.

Component A2

Under an atmosphere of nitrogen, 5.742 kg of dichlorodiphenyl sulfone, 5.076 kg of dihydroxydiphenyl sulfone and 305.8 g of 4,4'-dihydroxyvalearic acid were dissolved in 29 kg of N-methylpyrrolidone and mixed with 2.820 kg of anhydrous potassium carbonate. The reaction mixture was firstly heated for 1 h at 180° C. at a pressure of 300 mbar with continuous distilling-off of the water of reaction and N-methylpyrrolidone, and then reacted further for 6 h at 190° C.

After adding 40 kg of N-methylpyrrolidone, the inorganic constituents were filtered off. Basic groups were neutralized by adding 300 ml of glacial acetic acid, and the polymer was then isolated by precipitation in water. After three extractions with water, the product was dried in vacuo at 140° C. to give a white powder.

The proportion of units with acid groups was determined by H NMR as 3.0 mol %, and the viscosity number of the product was 40.2 ml/g.

Component A3

Under an atmosphere of nitrogen, 4.593 kg of dichlorodiphenyl sulfone and 4.002 kg of dihydroxydiphenylsulfone were dissolved in 29 kg of N-methylpyrrolidone and mixed with 2.923 kg of anhydrous potassium carbonate.

The reaction mixture was first heated for 1 h at 180° C. at a pressure of 300 mbar with continuous distilling-off of the water of reaction and N-methylpyrrolidone, and then further reacted for 6 h at 190° C.

235 g of 4-fluorophthalic anhydride were then added to the mixture and the reaction was continued at 190° C. for 0.2 h.

After adding 40 kg of N-methylpyrrolidone, the inorganic constituents were filtered off, and the polymer was then isolated by precipitation in water. After 3 extractions with water, the product was dried in vacuo at 160° C. to give a white material.

The content of phthalic anhydride end groups was 0.83% by weight, and the viscosity number of the polyarylene ether was 49.7 ml/g.

Component C1

Chopped glass fiber with polyurethane size and fiber diameter 10 μm.

Component C2

Talc (e.g. IT-Extra® from Norwegian Talc)

Component D1

Ethylene-propylene rubber which had been modified with 0.7% by weight of maleic acid/maleic anhydride and has an MFI of 3g/10' (measured at 230° C. and with a load of 216 kg).

Component F: Copper iodide

A premix was prepared from the respective component B and copper iodide. This was added to the other components.

The components were mixed in a twin-screw extruder at a melt temperature of from 300 to 350° C. The melt was passed through a water bath and pelletized.

The molding compositions were processed at 340° C. The mold temperature was in each case 100° C.

The makeups of the molding compositions and the results of the tests are given in Tables 1 and 2.

TABLE 1

| Molding composition | 1 comp | 2 comp | 1 | 3 comp | 2 | 4 comp | 3 | 4 | 5 |
|---|---|---|---|---|---|---|---|---|---|
| Makeup: | | | | | | | | | |
| A1 | 49 | 49 | 49 | 49 | 49 | 49 | 42 | 35 | 42 |
| A2 | — | — | — | — | — | — | 7 | 14 | — |
| A3 | — | — | — | — | — | — | — | — | 7 |
| B1 | — | — | 20.99 | — | — | — | 20.99 | 20.99 | 20.99 |
| B2 | — | — | — | — | 20.99 | — | — | — | — |
| B1 comp | 20.99 | — | — | — | — | — | — | — | — |
| B2 comp | — | 20.99 | — | — | — | — | — | — | — |
| B3 comp | — | — | — | 20.99 | — | — | — | — | — |
| B4 comp | — | — | — | — | — | 20.99 | — | — | — |
| C1 | 30 | 30 | 30 | 30 | 30 | 30 | 30 | 30 | 30 |
| F | 0.01 | 0.01 | 0.01 | 0.01 | 0.01 | 0.01 | 0.01 | 0.01 | 0.01 |
| Properties: | | | | | | | | | |
| Vicat B [°C.] | 206 | 206 | 202 | 202 | 204 | 203 | 202 | 203 | 202 |
| $a_n$ [kJ/m$^2$] | 51 | 47 | 53 | 48 | 51 | 48 | 58 | 65 | 64 |
| Modulus of elasticity [kN/mm$^2$] | 11.7 | 11.7 | 11.8 | 11.8 | 12.1 | 12.0 | 11.8 | 11.7 | 11.8 |
| MVI [ml/10'] | 24 | 28 | 32 | 38 | 26 | 31 | 29 | 28 | 26 |
| ΔUltimate tensile strength [%] | | | | | | | | | |
| After 100 h | 96 | 94 | 97 | 91 | 95 | 91 | 96 | 96 | 96 |
| After 250 h | 87 | 56 | 90 | 54 | 88 | 61 | 92 | 92 | 91 |
| After 1000 h | 83 | 43 | 89 | 41 | 86 | 54 | 91 | 91 | 90 |

TABLE 2

| Molding composition | 6 | 5 comp | 7 | 8 | 9 |
|---|---|---|---|---|---|
| Makeup: | | | | | |
| A1 | 70 | 70 | 63 | 56 | 63 |
| A2 | — | — | 7 | 14 | — |
| A3 | — | — | — | — | 7 |
| B1 | 24.99 | — | 24.99 | 24.99 | 24.99 |
| B3 comp | — | 24.99 | — | — | — |
| C2 | 0.1 | 0.1 | 0.1 | 0.1 | 0.1 |
| D1 | 5 | 5 | 5 | 5 | 5 |
| F | 0.01 | 0.01 | 0.01 | 0.01 | 0.01 |
| Properties: | | | | | |
| Vicat B [°C.] | 202 | 202 | 201 | 201 | 202 |
| ak [kJ/m$^2$] | 6.5 | 5.9 | 11.4 | 15.1 | 21.1 |
| MVI [ml/10'] | 16 | 19 | 14 | 12 | 10 |
| ΔPenetration energy [%] | | | | | |
| After 100 h | 87 | 77 | 89 | 90 | 91 |
| After 250 h | 74 | 41 | 85 | 87 | 90 |
| After 1000 h | 61 | 12 | 76 | 80 | 82 |

The novel thermoplastic molding compositions have very good mechanical properties and also markedly improved heat resistance.

We claim:

1. A molding composition comprising
   A) at least one polyarylene ether sulfone,
   B) at least one aliphatic polyamide,
   C) at least one filler,
   D) optionally, an impact-modifying rubber or a mixture of various impact modifying rubbers, and
   E) optionally, processing aids, stabilizers and oxidation inhibitors, agents to inhibit decomposition by heat or by ultraviolet light, lubricants and mold-release agents, dyes, pigments and plasticizers, and nucleating agents wherein the viscosity number of the polyamides B (measured in 0.5% strength by weight solution in 96% strength by weight sulfuric acid to DIN 53 727) is at least 180 ml/g, and the molding composition comprises
   F) from 100 ppm to 0.5% by weight, based on the total weight of A to E, or copper bromide or copper iodide or a mixture of these.

2. A molding composition as claimed in claim 1, where the polyarylene ether sulfones A comprise a$_1$)

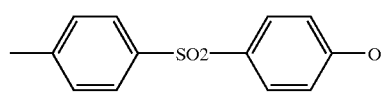
   (I1)

and a$_2$)

-continued

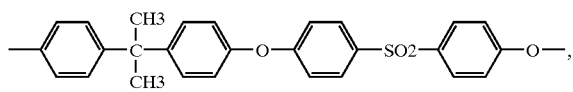
(I2)

either individually or in combination.

3. A molding composition as claimed in claim 1 or 2, in which A is a mixture made from at least one polyarylene ether sulfone (a1) having groups inert to the polyamides B and from at least one polyarylene ether sulfone (a2) containing functional groups which can react with the groups of the polyamides B.

4. A molding composition as claimed in claim 3, in which the functional groups of the polyarylene ether sulfones a2 are anhydride, carboxyl, epoxy or amino or a mixture of these.

5. A molding composition as claimed in claim 1, in which the polyamide B is polybutylene adipamide, polyhexamethylene adipamide or polycaprolactam or a mixture made from two or from all of these polyamide.

6. A process for preparing molding compositions as claimed in claim 1 by mixing the components followed by work-up, which comprises preparing a mixture made from components B and F in a first step and, in a second step, mixing this with the other components.

7. A molding obtainable from the molding compositions as claimed in claim 1.

* * * * *

UNITED STATES PATENT AND TRADEMARK OFFICE
CERTIFICATE OF CORRECTION

PATENT NO.    : 6,509,403 B1
DATED         : January 21, 2003
INVENTOR(S)   : Weber et al.

It is certified that error appears in the above-identified patent and that said Letters Patent is hereby corrected as shown below:

<u>Title page,</u>
Item [73], "Basf Aktiengesellschaft" should be -- BASF Aktiengesellschaft --.

Signed and Sealed this

Nineteenth Day of August, 2003

JAMES E. ROGAN
*Director of the United States Patent and Trademark Office*